(12) United States Patent
Guyon et al.

(10) Patent No.: US 11,731,503 B2
(45) Date of Patent: Aug. 22, 2023

(54) ACTIVE GRID DEVICE FOR MOTOR VEHICLES

(71) Applicant: Flex-N-Gate France, Audincourt (FR)

(72) Inventors: Cyrille Guyon, Nommay (FR); Yann Clapié, Stammham (DE); Bertrand Thoulouze, Gaimersheim (DE)

(73) Assignee: Flex-N-Gate France, Audincourt (FR)

( * ) Notice: Subject to any disclaimer, the term of this patent is extended or adjusted under 35 U.S.C. 154(b) by 213 days.

(21) Appl. No.: 17/121,964

(22) Filed: Dec. 15, 2020

(65) Prior Publication Data
US 2021/0188079 A1 Jun. 24, 2021

(30) Foreign Application Priority Data
Dec. 19, 2019 (FR) ...................................... 19 14983

(51) Int. Cl.
B60K 11/00 (2006.01)
B60K 11/08 (2006.01)
B60K 11/06 (2006.01)

(52) U.S. Cl.
CPC ............ B60K 11/085 (2013.01); B60K 11/06 (2013.01)

(58) Field of Classification Search
CPC .............................. B60K 11/085; B60K 11/06
See application file for complete search history.

(56) References Cited

U.S. PATENT DOCUMENTS

| | | | | |
|---|---|---|---|---|
| 8,960,343 | B2* | 2/2015 | Asano | B60K 11/085 180/68.1 |
| 9,168,827 | B2* | 10/2015 | Povinelli | B60K 11/06 |
| 9,447,719 | B2* | 9/2016 | Kiener | F28F 27/02 |
| 9,914,351 | B2* | 3/2018 | Kim | B60K 11/085 |
| 10,017,048 | B2* | 7/2018 | Manhire | B60R 19/52 |
| 10,166,858 | B2* | 1/2019 | Ibanez | B60K 11/085 |
| 10,220,699 | B1* | 3/2019 | Tian | B60K 13/06 |
| 10,421,352 | B2* | 9/2019 | Urbach | B60K 11/085 |
| 10,730,384 | B1* | 8/2020 | Klop | B60K 11/085 |

(Continued)

FOREIGN PATENT DOCUMENTS

| | | |
|---|---|---|
| DE | 10 2008 061 054 A1 | 6/2010 |
| DE | 10 2016 015 116 A1 | 6/2018 |

(Continued)

OTHER PUBLICATIONS

Rapport De Recherche Prélininaire issued in corresponding French Patent Application No. 1914983 dated Sep. 3, 2020.

*Primary Examiner* — Hau V Phan
(74) *Attorney, Agent, or Firm* — Troutman Pepper Hamilton Sanders LLP

(57) ABSTRACT

An active gate device, comprising first and second flaps, capable of pivoting between a closed position and an open position; first and second cam tracks; and first and second mechanisms connecting the flaps to the cam tracks. The device further comprises: a rotary actuating lever; and first and second shoes slidable in the first and second cam tracks, respectively. The actuating lever is pivotable between three configurations, such that: in the first configuration, each flap is in the closed position; in the second configuration, the first flap is in the open position and the second flap is in the closed position; and in the third configuration, each flap is in the open position.

9 Claims, 5 Drawing Sheets

(56) References Cited

U.S. PATENT DOCUMENTS

| | | | |
|---|---|---|---|
| 2010/0243352 A1* | 9/2010 | Watanabe | B60K 11/085 180/68.1 |
| 2011/0226541 A1* | 9/2011 | Hori | B60K 11/085 180/68.1 |
| 2014/0216834 A1* | 8/2014 | Elliott | B60K 11/085 180/68.1 |
| 2017/0248066 A1* | 8/2017 | Wolf | B60K 11/085 |
| 2018/0170170 A1* | 6/2018 | Nam | B60K 11/06 |
| 2019/0184813 A1* | 6/2019 | Lindberg | B29C 45/006 |

FOREIGN PATENT DOCUMENTS

| | | |
|---|---|---|
| EP | 3 323 656 A1 | 5/2018 |
| GB | 240 292 | 10/1925 |
| WO | 2017/021205 A2 | 2/2017 |
| WO | 2017/109371 A1 | 6/2017 |

* cited by examiner

ACTIVE GRID DEVICE FOR MOTOR VEHICLES

CROSS-REFERENCE TO RELATED APPLICATIONS

The present Application claims priority of French Patent Application No. 19 14983 filed Dec. 19, 2019. The entire contents of which are hereby incorporated by reference.

FIELD OF THE INVENTION

The present invention relates to an active grid device, of the type comprising: a frame; a first mobile assembly, comprising at least one first flap capable of pivoting with respect to the frame between a closed position and an open position; a second mobile assembly, comprising at least one second flap capable of pivoting with respect to the frame between a closed position and an open position; a first and a second cam track; and a first and a second connecting mechanisms connecting the first and second mobile assemblies to the first and second cam tracks, respectively, each of the first and second connecting mechanisms comprising at least one connecting rod.

BACKGROUND

In a known manner, such an active grid device is arranged at the front of a motor vehicle, in order to regulate an air inlet into the interior of said vehicle during its movement. Such an air inlet makes it possible in particular to cool an engine compartment of the said vehicle.

In order to precisely modulate the circulation of air from the outside to the inside of the vehicle, it is known, for example from document WO2017/109371, to equip the active grille device with several flaps. These can be moved independently into the open or closed position, so that the air flow to the inside of the vehicle can be gradually changed.

SUMMARY

The object of the present invention is to propose a device which is simple to realize and which allows to modulate efficiently an air flow through the said device.

For this purpose, the object of the invention is to propose an active grid device of the above-mentioned type, in which: the first and second cam tracks are fixed with respect to the frame; and the device further comprises: an actuating lever rotatable with respect to the frame; and a first and a second shoe, movable in translation with respect to the actuating lever, said first and second shoes being able to slide respectively in the first and second cam tracks; the connecting rod of each of the first and second connecting mechanisms being articulated respectively on the first and second shoes. The actuating lever is capable of pivoting relative to the frame between a first, a second and a third configuration, such that: in the first configuration, each of the first and second flaps is in the closed position; in the second configuration, the first flap is in the open position and the second flap is in the closed position; and in the third configuration, each of the first and second flaps is in the open position.

The device according to the invention thus allows a sequential opening of the flaps, associated with the cooling needs.

According to other advantageous aspects of the invention, the active grid device has one or more of the following features, taken alone or in any technically possible combination:

the device further comprises an actuator connected to the actuating lever, said actuator being capable of pivoting said lever relative to the frame between the first, second and third configurations;

the first cam track has an active portion and an inactive portion, configured such that: pivoting the actuating lever between the first and second configurations causes the first shoe to slide in the active portion of the first cam track; and pivoting the actuating lever between the second and third configurations causes the first shoe to slide in the inactive portion of the first cam track;

the device is configured such that sliding the first shoe into the active portion of the first cam track results in translation of the connecting rod of the first coupling mechanism so as to pivot the first flap between the closed and open positions;

the second cam track has an inactive portion and an active portion, configured such that: pivoting the operating lever between the first and second configurations causes the second shoe to slide into the inactive portion of the second cam track; and pivoting the operating lever between the second and third configurations causes the second shoe to slide into the active portion of the second cam track;

the device is configured such that sliding the second shoe into the active portion of the second cam track results in a translation of the connecting rod of the second coupling mechanism so as to pivot the second shoe between the closed and open positions;

the first movable assembly comprises a plurality of first flaps, capable of pivoting relative to the frame between a closed position and an open position along distinct and parallel axes; and the first coupling mechanism comprises a first transmission element articulated to each of said first flaps, said first transmission element being articulated to the connecting rod of said first coupling mechanism;

the second movable assembly comprises a plurality of second flaps, capable of pivoting with respect to the frame between a closed position and an open position along distinct and parallel axes; and the second coupling mechanism comprises a second transmission element articulated to each of said second flaps, said second transmission element being articulated to the connecting rod of said second coupling mechanism.

The invention further relates to a motor vehicle comprising an active grid device as described above.

BRIEF DESCRIPTION OF THE DRAWINGS

The invention will be better understood on reading the description which follows, given only as a non-limitative example and made with reference to the figures on which.

DETAILED DESCRIPTION OF THE DRAWINGS

Figure 1:
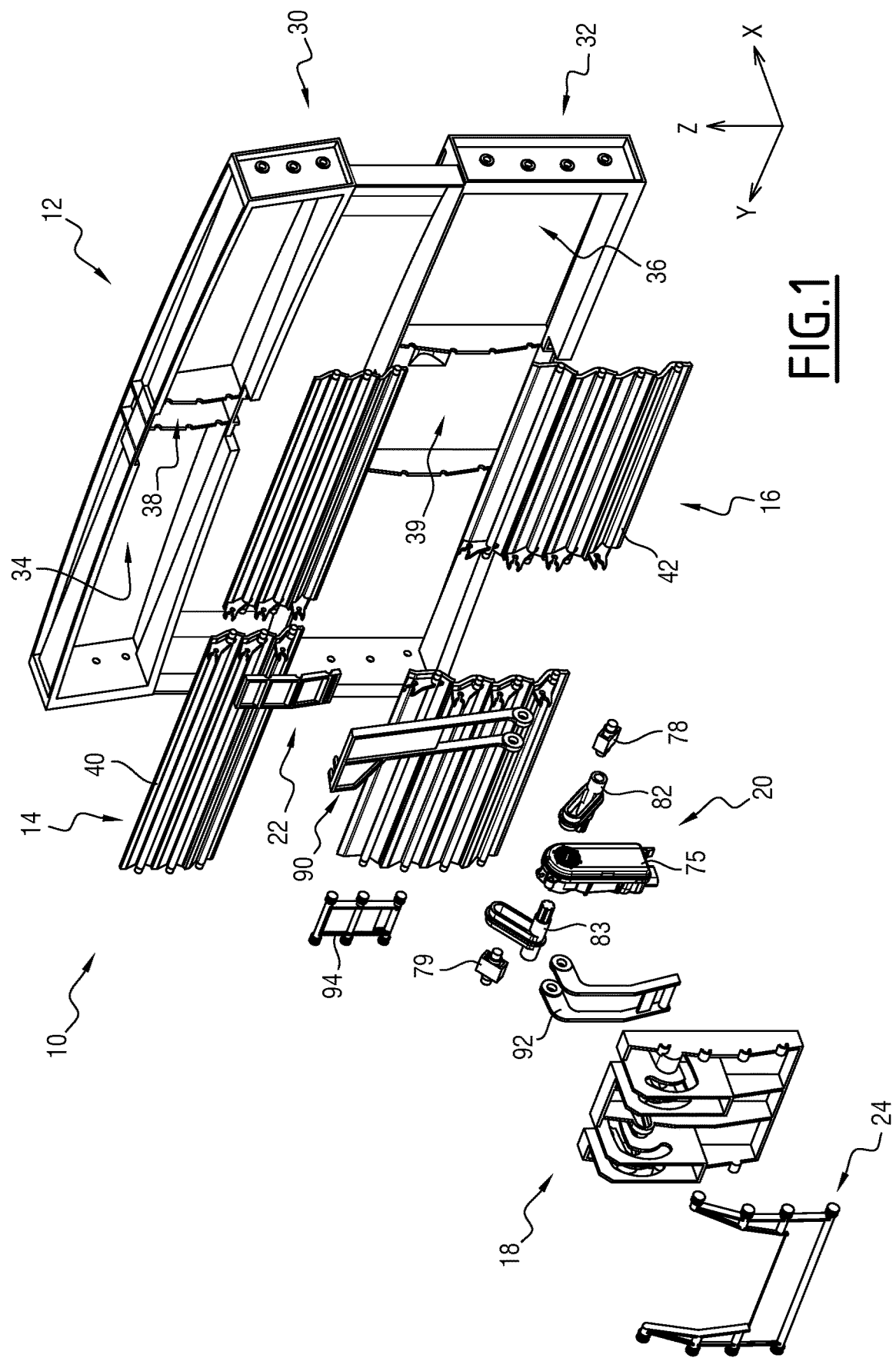
FIG. 1 is an exploded perspective view of an active grid device according to an embodiment of the invention.
Figure 2:
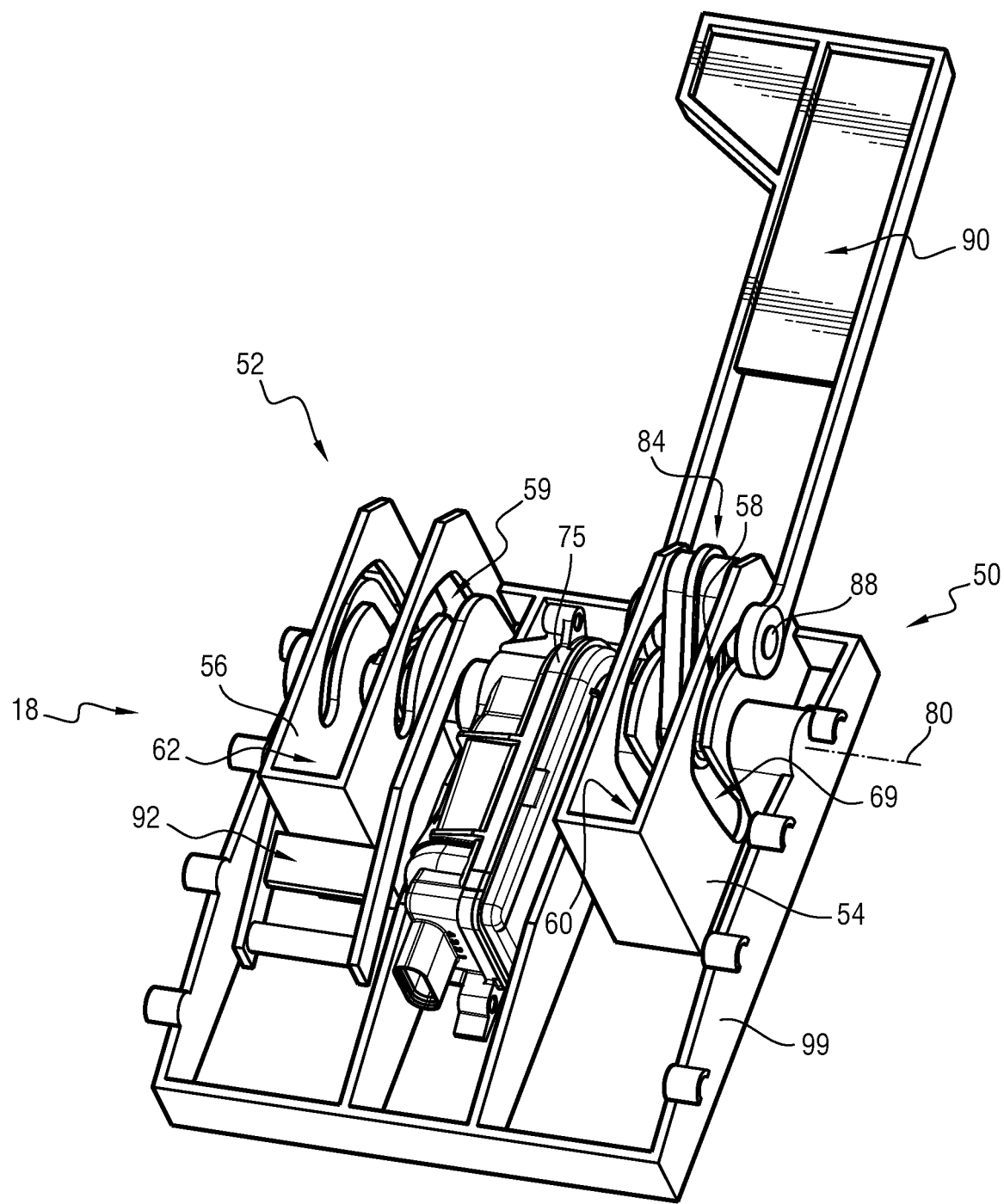
FIG. 2 is a detailed view of the device in FIG. 1.

FIG. 1 shows an exploded perspective view of an active grid device in an embodiment of the invention.

Device 10 is in particular intended to be assembled to a front part of a motor vehicle (not shown), in order to regulate an air inlet into an engine compartment of the said vehicle.

Device 10 comprises in particular: a frame 12; a first 14 and a second 16 set of movable flaps; a cam structure 18; an actuating device 20; and a first 22 and a second 24 coupling mechanism.

Preferably, frame 12 is substantially flat and has a substantially parallelepipedal contour. In the remainder of the description, an orthonormal base (X, Y, Z) associated with frame 12 in a configuration assembled to a motor vehicle (not shown) is considered. The Z-direction represents the vertical and the X-direction represents a direction of travel of the vehicle.

Frame 12 is substantially arranged in a (Y, Z) plane. Frame 12 has a first 30 and a second 32 flap housings. The first 30 and the second 32 housings are essentially aligned in a Z-direction, with the first slot 30 above the second housing 32.

Each housing 30, 32 has at least one opening 34, 36 delimited by a parallelepiped edge, with sides substantially aligned in Y and Z.

In the embodiment shown, each housing 30, 32 has two openings 34, 36 approximately aligned according to Y. The openings 34 of the first housing 30 are substantially identical and are separated according to Y by a first panel 38. The openings 36 of the second housing 32 are substantially identical and are separated according to Y by a second panel 39.

According to a variant not shown, the first 30 and/or the second 32 housing has a single opening, or a number of openings greater than or equal to three.

Each of the first 14 and second 16 sets of movable flaps is rotatably mounted on frame 12, so that the first 30 and second 32 housings are opened and closed respectively.

Each of the first 14 and second 16 sets includes at least one flap 40, 42 rotatable relative to frame 12, along an axis substantially parallel to Y. As will be described below, each flap 40, 42 is capable of pivoting relative to frame 12 between a closed and an open position.

In the embodiment shown, each of the first 14 and second 16 sets has a plurality of flaps 40, 42.

Preferably, each of the two openings 34 of the first housing 30 receives several flaps 40 arranged one above the other, according to distinct axes of rotation 43, 44 and substantially parallel to Y. Preferably, the same axis 43, 44 is common to two flaps 40 located in each of the two openings 34.

Preferably, each of the two openings 36 of the second housing 32 receives several flaps 42 arranged one above the other, according to distinct axes of rotation 45, 46 and substantially parallel to Y. Preferably, the same axis 45, 46 is common to two flaps 42 located in each of the two openings 36.

One end according to Y of each flap 40 of the first set 14 is notably hinged to the first panel 38, separating the openings 34 from the first housing 30. One end according to Y of each flap 42 of the second set 16 is hinged to the second panel 39, separating the openings 36 of the second housing 32.

A number of flaps 40, 42 received in the same opening 34, 36 is for example two to six flaps. In the design shown, each opening 34 of the first housing 30 receives three flaps 40 and each opening 36 of the second housing 32 receives four flaps 42.

The cam structure 18 consists of a first 50 and a second 52 cam tracks. Each of said first 50 and second 52 cam tracks has at least one plate 54, 56, each of said plates 54, 56 having a slot 58, 59 at the closed ends.

In the embodiment shown, each of the first 50 and second 52 cam tracks has a pair of plates 54, 56. Each plate 54, 56 has a slot 58, 59 at the closed ends. The slots 58 of the two plates 54 of the first cam track 50 have an identical shape. Similarly, the slots 59 of the two plates 56 of the second cam track 52 have an identical shape.

Each plate 54, 56 of the first cam track 50 and the second cam track 52 is attached to frame 12. Specifically, each plate 54, 56 is arranged in one plane (X, Z) and forms a projection along X from the second panel 39 of frame 12.

In the embodiment shown, each plate 54, 56 of the first 50 and second 52 cam tracks is formed in one piece with a support 99, said support 99 being fixed to the second panel 39.

The two plates 54 of the first cam track 50 are Y-spaced by a first gap 60 and arranged so that the slots 58 of said plates 54 face each other. Likewise, the two plates 56 of the second cam track 52 are spaced at Y intervals by a second gap 62 and arranged so that the slots 59 of said plates 56 face each other.

Each of the first 50 and second 52 cam paths has an active portion 64, 65 and an inactive portion 66, 67, is continuous to each other.

Each of the active portions 64, 65 corresponds to a part of the slot 58, 59 having substantially the shape of a first arc of a circle of small radius of curvature. The said first arc of a circle forms an angle of approximately 90°. The ends of the said first arc are located substantially one above the other in the Z direction.

Each of the inactive portions 66, 67 corresponds to a part of the slot 58, 59 having substantially the shape of a second circular arc of high radius of curvature. "High radius of curvature" means that for each cam track 50, 52, the radius of curvature of the second arc is greater than the radius of curvature of the first arc. The said second arc of a circle forms an acute angle, the ends of the said second arc of a circle being substantially aligned along the X axis.

In the first cam track 50, the active portion 64 extends upwards relative to the inactive portion 66. A first end 68 of each slot 58 is adjacent to the active portion 64. A second end 69 of each slot 58 is adjacent to the inactive portion 66.

In the second cam track 52, the active portion 65 extends downward relative to the inactive portion 67. A first end 70 of each slot 59 is adjacent to the inactive portion 67. A second end 71 of each slot 59 is adjacent to the active portion 65.

Actuating device 20 consists of: an actuator 75, an actuating lever 76 and a first 78 and a second 79 skids.

Actuator 75 is attached to the second panel 39 of frame 12, between the first 50 and second 52 cam tracks. Actuator lever 76 is rotatably mounted on actuator 75 along an axis 80 parallel to Y.

According to the embodiment shown, the actuator 75 is attached to bracket 99, with bracket 99 attached to the second panel 39.

For each of the first 50 and second 52 cam tracks, the concavities of the active portion 64, 65 and the inactive portion 66, 67 are oriented towards the axis 80 of rotation of actuator lever 76.

Actuating lever 76 consists of a first 82 and a second 83 section, arranged on either side of actuator 75 according to Y. Each of said first 82 and second 83 sections comprises a first 84 and a second 85 slide respectively. Each slide 84, 85 forms a radial projection with respect to the axis 80 of rotation of lever 76.

Each slide 84, 85 extends along an axis 86, 87 perpendicular to Y. The axes 86, 87 of the first 84 and second 85 slides form a non-zero angle of between 45° and 135°. Preferably, this angle is about 90°.

The first 78 and the second 79 shoes are received in the first 84 and the second 85 slides respectively. Each shoe 78, 79 is able to slide in the corresponding slide 84, 85 along the axis 86, 87 of the said slide.

Each of the first 78 and second 79 shoes has a pin 88, 89. Each pin 88, 89 forms a projection according to Y, on both sides of the slide 84, 85 corresponding to shoe 78, 79.

The first slide 84 is arranged in the first space 60 between plates 54 of the first cam track 50. Each end of pin 88 of the first shoe 78 is received and able to move in the slot 58 of one of the said plates 54.

The second slide 85 is disposed in the second space 62 between the plates 56 of the second cam track 52. Each end of pin 89 of the second shoe 79 is received and movable in the slot 59 of one of said plates 56.

Each of the first 22 and second 24 coupling mechanisms comprises respectively: a first 90 and a second 92 connecting rod; and a first 94 and a second 96 transmission element.

A first end of each of the first 90 and second 92 connecting rods is articulated, respectively, on the first 78 and the second 79 shoes, along an axis parallel to Y. According to the embodiment, each of the first 90 and second 92 connecting rods has two legs 97, 98. Each of the legs of the same connecting rod is articulated on pin 88, 89 of the corresponding shoe, on either side of the corresponding slide 84, 85 and on either side of the corresponding cam track 50, 52.

A second end of each of the first 90 and second 92 connecting rods is articulated, respectively, on the first 94 and on the second 96 transmission element, along an axis parallel to the Y axis.

In addition, the first transmission element 94 is hinged to each flap 40 of the first set 14 of movable flaps, along axes parallel to Y. In particular, movement of the first transmission element 94 relative to frame 12 is capable of pivoting all the flaps 40 of the first set 14 between an open and a closed position.

In addition, the second transmission element 96 is hinged to each flap 42 of the second set 16 of movable flaps, along axes parallel to Y. In particular, movement of the second transmission element 96 relative to frame 12 is capable of pivoting all of the flaps 42 of the second set 16 between an open and a closed position.

Figure 3:
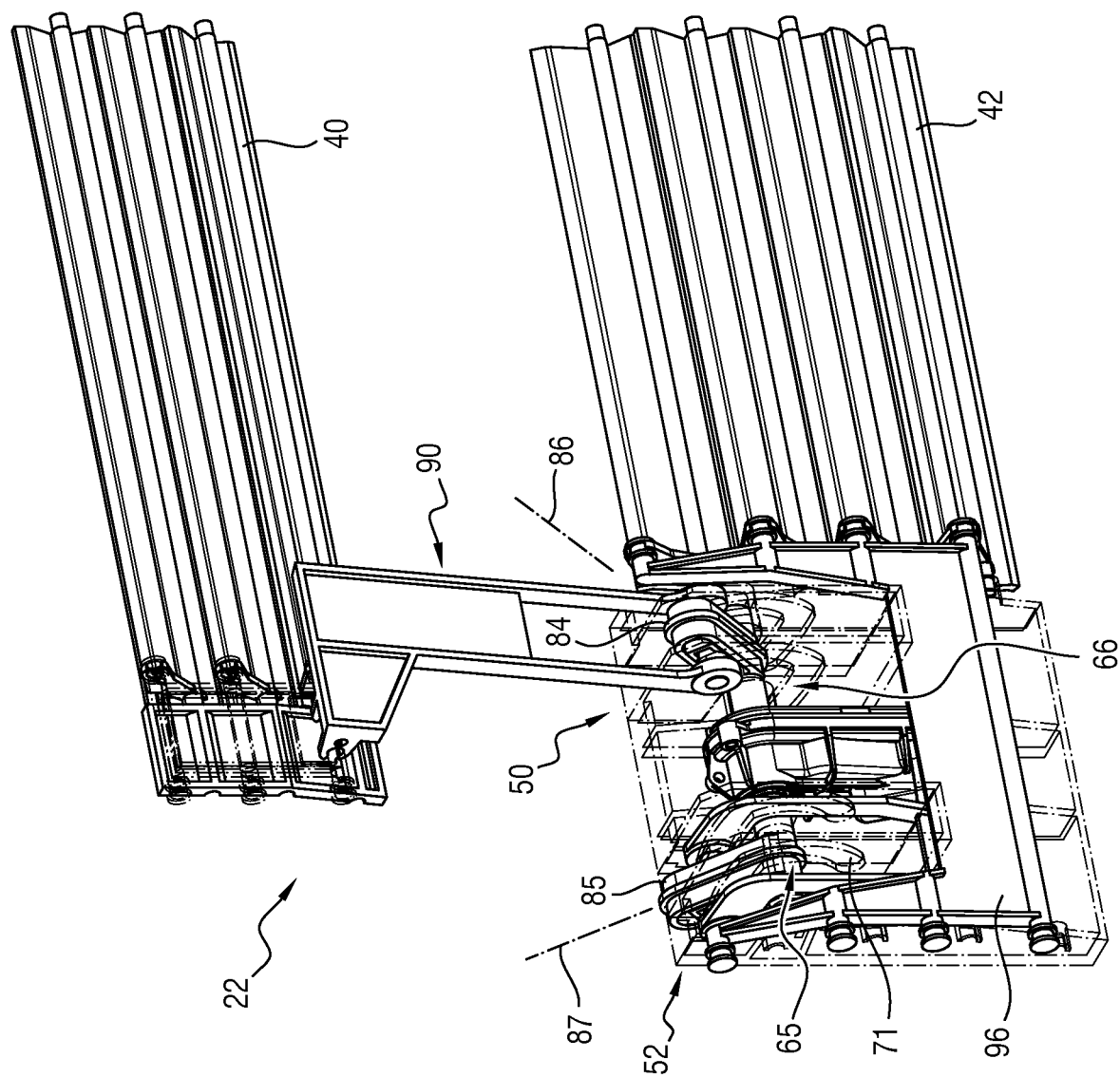
FIGS. 3, 4 and 5 are partial views of the device in FIG. 1, in a first, second and third configuration respectively.

FIG. 3 shows device 10 in a first configuration described below.

In the first configuration, all the flaps 40 of the first set 14 are in a so-called closed position, in which the openings 34 of the first housing 30 are closed by the said flaps 40.

The closed position of the flaps 40 of the first set 14 corresponds to a so-called high position of the first transmission element 94, hinged to each flap 40, as well as to a so-called high position of the first connecting rod 90, hinged to said first transmission element 94.

In the same way, in the first configuration, all the flaps 42 of the second set 16 are in a position called closed, in which the openings 36 of the second housing 32 are closed by said flaps 42.

The closed position of the flaps 42 of the second set 16 corresponds to a so-called high position of the second transmission element 96, hinged to each flap 42, as well as to a so-called high position of the second connecting rod 92, hinged to said second transmission element 96.

Furthermore, in the first configuration, pin 88 of the first shoe 78 of actuator 20 contacts the first end 68 of each slot 58 of the first cam track 50, and pin 89 of the second shoe 79 of actuator 20 contacts the first end 70 of each slot 59 of the second cam track 52.

Figure 4:
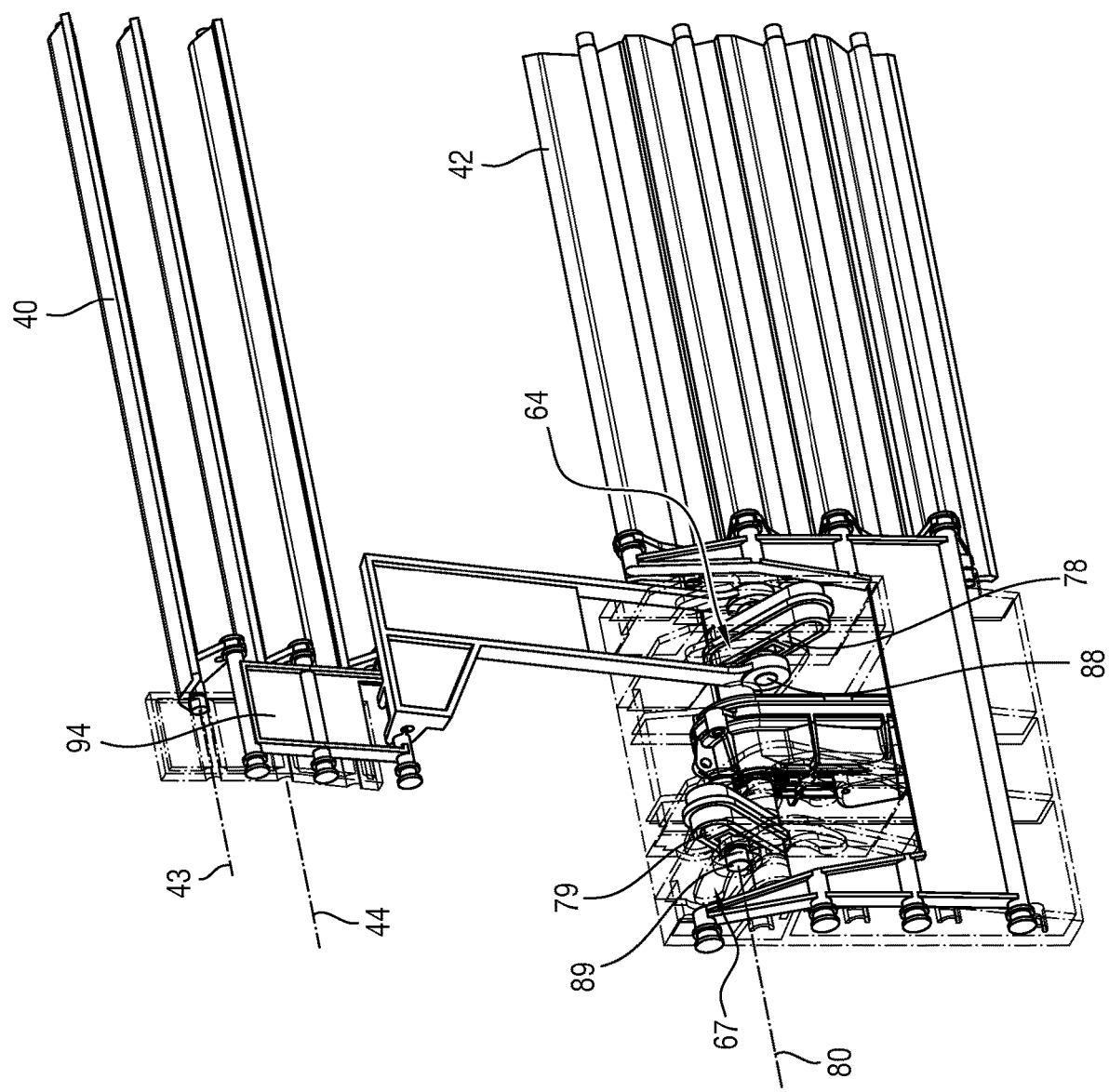

FIG. 4 shows device 10 in a second configuration described below.

In the second configuration, all flaps 40 of the first assembly 14 are in a so-called open position, in which maximum space is left for air flow through the openings 34 of the first housing 30.

The open position of the flaps 40 of the first set 14 corresponds to a so-called lower position of the first transmission element 94, hinged to each flap 40. In the said lower position, the first transmission element 94 is located lower according to Z than in the upper position described above.

In the same way, the open position of the flaps 40 of the first set 14 corresponds to a position known as the low position of the first connecting rod 90, articulated to the first transmission element 94. In the said lower position, the first connecting rod 90 is located lower according to Z than in the upper position described above.

On the other hand, in the second configuration, all the flaps 42 of the second set 16 are in the closed position described above. The second transmission element 96 and the second connecting rod 92 are in the up position described above.

Furthermore, in the second configuration, pin 88 of the first shoe 78 is located at a junction between the active 64 and inactive 66 portions of the first cam track 50, and pin 89 of the second shoe 79 is located at a junction between the inactive 67 and active 65 portions of the second cam track 52.

Figure 5:
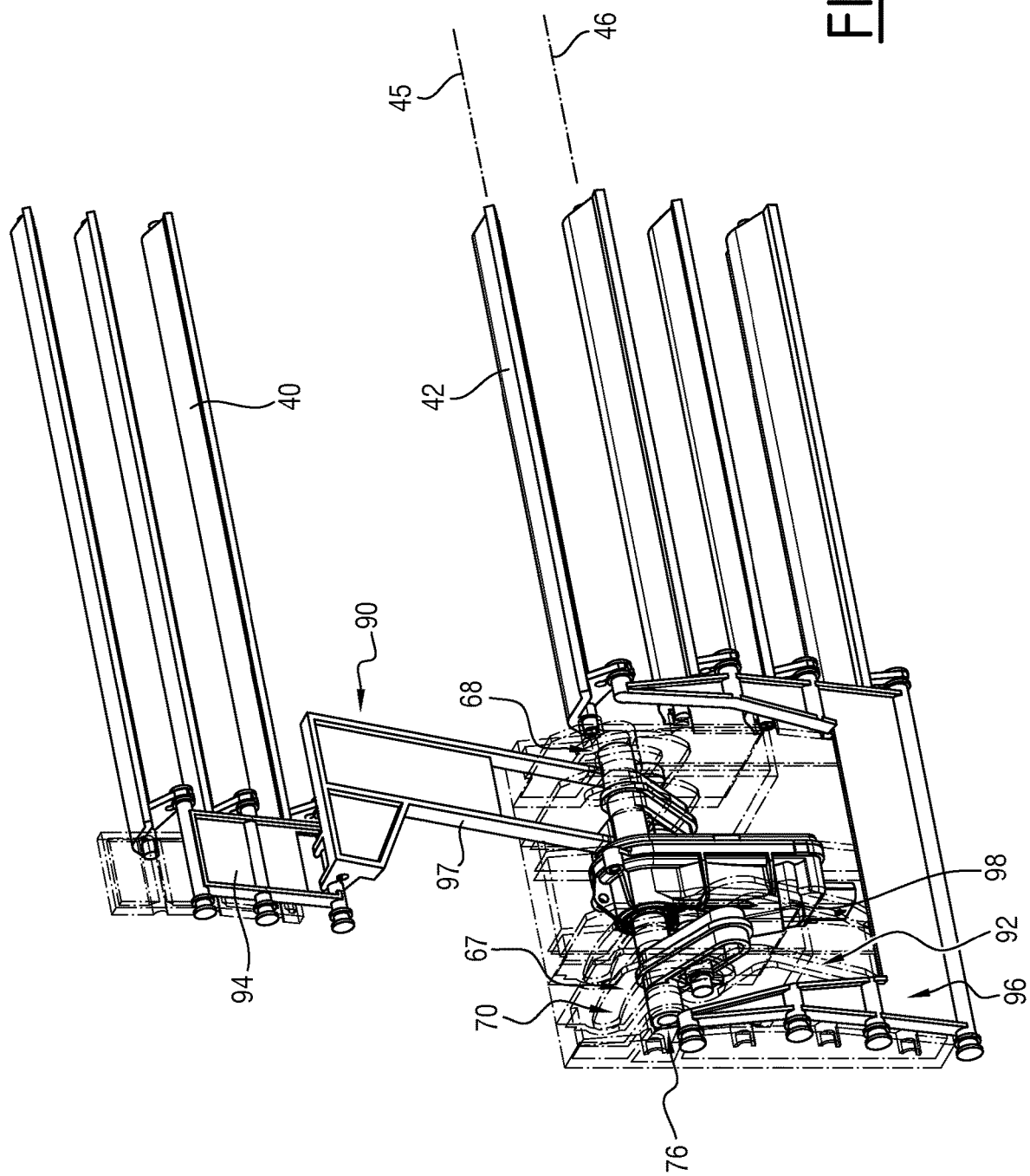

FIG. 5 shows device 10 in a third configuration described below.

In the third configuration, all flaps 40 of the first assembly 14 are in the open position described above. The first connecting rod 90 and the first transmission element 94 are in the lower position described above.

In addition, in the third configuration, all dampers 42 of the second set 16 are in a so-called open position, in which maximum space is left for air to pass through the openings 36 of the second housing 32.

The open position of the flaps 42 of the second set 16 corresponds to a so-called low position of the second transmission element 96, hinged to each flap 42. In the said lower position, the second transmission element 96 is located lower according to Z than in the upper position described above.

In the same way, the open position of the flaps 42 of the second set 16 corresponds to a position known as the low position of the second connecting rod 92, articulated to the second transmission element 96. In this lower position, the second connecting rod 92 is located lower in Z than in the upper position described above.

Furthermore, in the third configuration, pin 88 of the first shoe 78 is in contact with the second end 69 of each slot 58 of the first cam track 50, and pin 89 of the second shoe 79 is in contact with the second end 71 of each slot 59 of the second cam track 52.

A method of operating device 10 will now be described. Such a method is implemented, for example, by means of a program stored in an electronic control module (not shown) of a motor vehicle (not shown) containing device 10.

Such a program associates, for example, each of the first, second and third configurations of device 10 described above with a specific cooling requirement of an engine compartment of the vehicle. Such a specific cooling requirement is, for example, determined by comparing an engine compartment temperature with a predefined threshold in the program. The cooling may relate to the vehicle's engine, batteries or other accessories.

Device 10 is initially considered to be in the first configuration described above. With the flaps 40, 42 being in the closed position, air circulation through openings 34, 36 is at a minimum level when the vehicle with device 10 is moving.

Thus, in the first configuration, the air flow around the vehicle is deflected, resulting in an aerodynamic gain and an associated reduction in $CO_2$ emissions.

In addition, the first configuration allows the vehicle's engine to be quickly warmed up to quickly reach its optimum operating temperature.

In the event that the program determines a need for cooling of the engine compartment, the actuator 75 rotates the actuator lever 76 around rotation axis 80. Driven by the first 84 and second 85 sliders respectively, pins 88, 89 of the first 78 and second 79 shoes move in slots 58, 59, respectively of the first 50 and second 52 cam tracks.

Specifically, from the first end 68 of slots 58, pin 88 of the first shoe 78 moves into the active portion 64 of the first cam track 50. The first connecting rod 90, articulated on pin 88, thus moves from the upper position to the lower position. Similarly, the first transmission element 94, which is hinged to the first connecting rod 90, moves from the up position to the down position. This movement leads to the pivoting of the flaps 40 of the first set 14 from the closed position to the open position.

In addition, from the first end 70 of the slots 59, pin 89 of the second shoe 79 moves into the inactive portion 67 of the second cam track 52. This inactive portion 67 is configured so that the second connecting rod 92, which is articulated to pin 89, pivots about its articulation to the second transmission element 96 without moving the second transmission element. The flaps 42 of the second assembly 16 therefore remain in the closed position.

The second configuration is reached when each pin 88, 89 reaches the junction between the active portions 64, 65 and inactive portions 66, 67 of the corresponding cam track 50, 52. The flaps 40 of the first set 14 are then in the open position.

Due to the opening of only the first set 14 of flaps, the second configuration of device 10 allows an intermediate level of airflow through the openings 34, 36 of said device 10.

If the cooling requirements are reduced, as determined by the program, actuator 75 reverses actuator lever 76 to return device 10 to the first configuration.

Conversely, if the program determines that an intermediate level of ventilation is insufficient to cool the engine compartment, actuator 75 continues to pivot actuator lever 76 about the axis of rotation 80 in the initial direction. This pivoting causes pins 88, 89 of the first 78 and second 79 shoes to continue to move into slots 58, 59 of the first 50 and second 52 cam tracks.

Specifically, from the second configuration, spindle 88 of the first shoe 78 moves into the inactive portion 66 of the first cam track 50. This inactive portion 66 is configured so that the first connecting rod 90, which is articulated to pin 88, pivots about its articulation to the first transmission element 94 without moving the first transmission element. The flaps 40 of the first set 14 thus remain in the open position.

Furthermore, from the second configuration, pin 89 of the second shoe 79 moves into the active portion 65 of the second cam track 52. The second connecting rod 92, which is articulated on pin 89, thus moves from the high position to the low position. Similarly, the second transmission element 96, which is articulated to the second connecting rod 92, moves from the high position to the low position. This movement leads to the pivoting of the flaps 42 of the second set 16 from the closed position to the open position.

The third configuration is reached when each pin 88, 89 reaches the second end 69, 71 of each slot 58, 59 of the corresponding cam track 50, 52. The flaps 40 of the first set 14 and the flaps 42 of the second set 16 are then in the open position.

Due to the opening of the two sets 14, 16 of flaps, the third configuration of device 10 allows a maximum level of airflow through openings 34, 36 of said device 10, for maximum cooling of the vehicle engine compartment.

If the cooling requirements are reduced, as determined by the program, actuator 75 rotates actuating lever 76 in the opposite direction. By moving pins 88, 89 in the slots 58, 59 in the opposite direction, device 10 switches from the third to the second configuration and then, if necessary, from the second to the first configuration.

Device 10 with active grid thus allows a sequential opening of the flaps 40, 42, associated with the need for cooling.

Device 10 therefore makes it possible to simply and effectively modulate the air circulation inside a motor vehicle during its movement.

The invention claimed is:

1. A grid device, comprising:
a frame;
a first mobile assembly, comprising at least a first flap capable of pivoting with respect to the frame between a closed position and an open position;
a second mobile assembly comprising at least one second flap capable of pivoting with respect to the frame between a closed position and an open position;
first and second cam tracks; and
a first and a second coupling mechanism connecting the first and second mobile assemblies, respectively to the first and second cam track, each of the first and second coupling mechanisms comprising at least one connecting rod;
said connecting rod of the first coupling mechanism being connected to the first flap, so as to allow said first flap to pivot between the closed and open positions;
said connecting rod of the second coupling mechanism being connected to the second flap, so as to allow said second flap to pivot between the closed and open positions;
wherein:
the first and second cam tracks are fixed relative to the frame; and
the device also comprises:
an operating lever rotatable relative to the frame; and
a first and a second shoe, mobile in translation with respect to the actuating lever, said first and second shoes being able to slide respectively in the first and second cam tracks;
the connecting rod of each of the first and second coupling mechanisms being articulated respectively on the first and second shoes; and the first and second shoes being articulated respectively on the first and second cam tracks;
the operating lever can be rotated in relation to the frame between a first, second and third configuration, wherein:
in the first configuration, each of the first and second flaps is in the closed position;
in the second configuration, the first flap is in the open position and the second flap is in the closed position; and in the third configuration, each of the first and second flaps is in the open position.

2. The grid device according to claim 1, further comprising an actuator connected to the actuating lever, said actuator being capable of pivoting said lever relative to the frame between the first, second and third configurations.

3. The grid device according to claim 1, wherein the first cam track comprises an active portion and an inactive portion, configured such that:
  pivoting of the actuating lever between the first and second configurations causes the first shoe to slide in the active portion of the first cam track; and
  pivoting the operating lever between the second and third configurations causes the first shoe to slide into the inactive portion of the first cam track.

4. The grid device according to claim 3, configured so that the sliding of the first shoe in the active portion of the first cam track leads to a translation of the connecting rod of the first coupling mechanism, so as to cause the first flap to pivot between the closed and open positions.

5. The grid device according to claim 1, in which the second cam track comprises an inactive portion and an active portion, configured so that:
  pivoting of the actuating lever between the first and second configurations causes the second shoe to slide in the inactive portion of the second cam track; and
  pivoting the operating lever between the second and third configurations causes the second shoe to slide into the active portion of the second cam track.

6. The grid device according to claim 5, configured so that sliding of the second shoe in the active portion of the second cam track leads to a translation of the connecting rod of the second coupling mechanism, so as to cause the second flap to pivot between the closed and open positions.

7. The grid device according to claim 1, in which:
  the first movable assembly comprises a plurality of first flaps, capable of pivoting with respect to the frame between a closed position and an open position according to distinct and parallel axes; and
  the first coupling mechanism comprises a first transmission element articulated to each of said first flaps, said first transmission element being articulated to the connecting rod of said first coupling mechanism.

8. The grid device according to claim 1, in which:
  the second movable assembly comprises a plurality of second flaps, capable of pivoting with respect to the frame between a closed position and an open position along distinct and parallel axes; and
  the second coupling mechanism comprises a second transmission element articulated to each of said second flaps, said second transmission element being articulated to the connecting rod of said second coupling mechanism.

9. A motor vehicle comprising a grid device,
  a frame;
  a first mobile assembly, comprising at least a first flap capable of pivoting with respect to the frame between a closed position and an open position;
  a second mobile assembly comprising at least one second flap capable of pivoting with respect to the frame between a closed position and an open position;
  first and second cam tracks; and
  a first and a second coupling mechanism connecting the first and second mobile assemblies, respectively to the first and second cam track,
  each of the first and second coupling mechanisms comprising at least one connecting rod;
  said connecting rod of the first coupling mechanism being connected to the first flap, so as to allow said first flap to pivot between the closed and open positions;
  said connecting rod of the second coupling mechanism being connected to the second flap, so as to allow said second flap to pivot between the closed and open positions;
  wherein:
  the first and second cam tracks are fixed relative to the frame; and
  the device also comprises:
  an operating lever rotatable relative to the frame; and
  a first and a second shoe, mobile in translation with respect to the actuating lever, said first and second shoes being able to slide respectively in the first and second cam tracks;
  the connecting rod of each of the first and second coupling mechanisms being articulated respectively on the first and second shoes; and the first and second shoes being articulated respectively on the first and second cam tracks;
  the operating lever can be rotated in relation to the frame between a first, second and third configuration, wherein:
  in the first configuration, each of the first and second flaps is in the closed position;
  in the second configuration, the first flap is in the open position and the second flap is in the closed position; and
  in the third configuration, each of the first and second flaps is in the open position.

* * * * *